United States Patent

Kosaka et al.

[11] Patent Number: 5,986,826
[45] Date of Patent: Nov. 16, 1999

[54] DRIVE DEVICE USING ELECTROMECHANICAL CONVERSION ELEMENT

[75] Inventors: Akira Kosaka, Yao; Tetsuro Kanbara; Satoshi Shinke, both of Sakai, all of Japan

[73] Assignee: Minolta Co., Ltd., Osaka, Japan

[21] Appl. No.: 08/991,550

[22] Filed: Dec. 16, 1997

[30] Foreign Application Priority Data

Dec. 17, 1996 [JP] Japan ..................................... 8-353317
Dec. 17, 1996 [JP] Japan ..................................... 8-353318

[51] Int. Cl.⁶ ............................. G02B 7/02; G02B 25/00; G02B 15/14
[52] U.S. Cl. .......................... 359/814; 359/646; 359/696; 359/830
[58] Field of Search .................................. 359/646, 696, 359/811–830

[56] References Cited

U.S. PATENT DOCUMENTS

| | | |
|---|---|---|
| 4,195,243 | 3/1980 | Thaxter . |
| 4,894,579 | 1/1990 | Higuchi et al. . |
| 4,912,493 | 3/1990 | Tanaka . |
| 5,172,276 | 12/1992 | Ueyama ..................................... 359/813 |
| 5,225,941 | 7/1993 | Saito et al. . |
| 5,684,640 | 11/1997 | Tanaka ..................................... 359/694 |
| 5,684,840 | 11/1997 | Tanaka ..................................... 359/684 |
| 5,748,391 | 5/1998 | Tanaka ..................................... 359/813 |

Primary Examiner—Georgia Epps
Assistant Examiner—Michael A Lucas
Attorney, Agent, or Firm—McDermott, Will & Emery

[57] ABSTRACT

A drive device for driving an optical element suitable to be attached to a camera shake correction device. The drive device employs items molded from a synthetic resin in which the elastic deformation of the synthetic resin allows the oscillation of a piezoelectric element to be adequately converted to drive power. The drive device includes an electromechanical conversion element, a baseplate equipped with a securing area secured to one end of the electromechanical conversion element, and a drive member that is securely linked to the other end of the electromechanical conversion element and displaced together with the electromechanical conversion element. The device further includes a transport member constructed from a rigid synthetic resin material with a Rockwell hardness of about 120 or more and which is frictionally linked to the drive member.

22 Claims, 10 Drawing Sheets

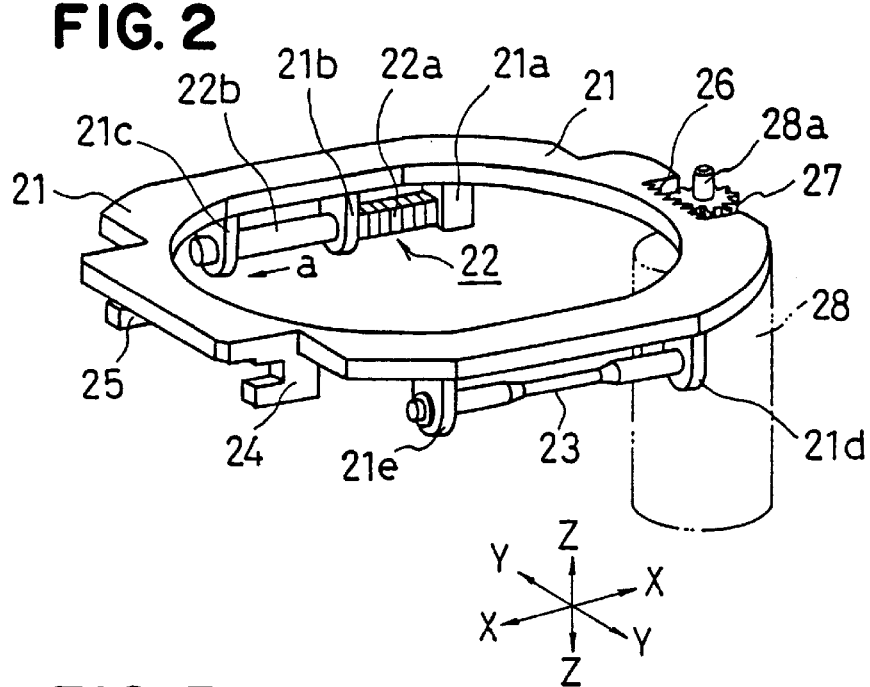
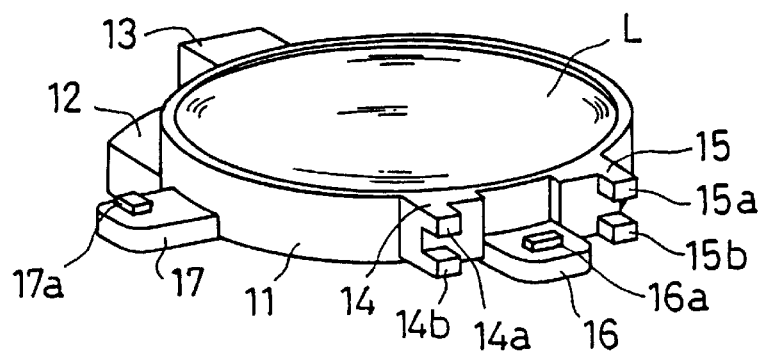
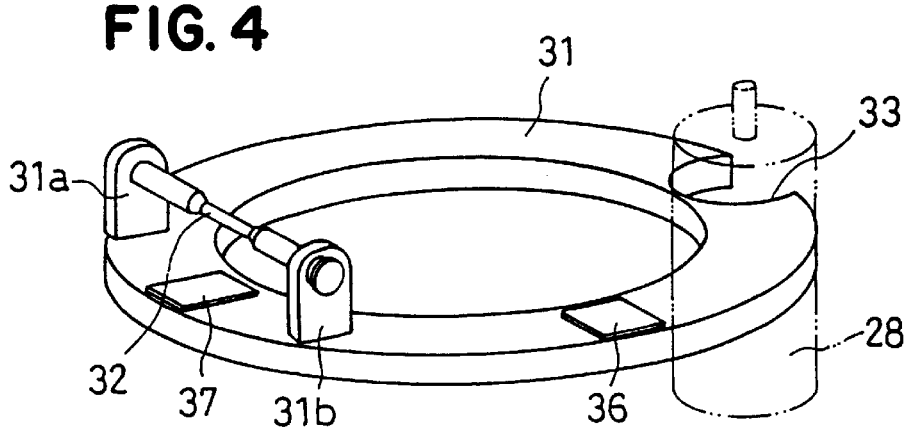

DRIVE DEVICE USING ELECTROMECHANICAL CONVERSION ELEMENT

BACKGROUND OF THE INVENTION

1. Field of the Invention

The present invention specifically relates to a drive device using a small, lightweight electromechanical conversion element and is applied to drive an optical element or the like in an optical device.

2. Description of the Related Art

Under conditions where a camera is unsteadily held while taking a photograph, image blurring occurs in the imaging plane. A well known means to correct this phenomenon includes an optical stabilization system in which two corrective lenses, positioned immediately behind the aperture of the photographic lens are driven eccentrically within the plane, perpendicular to the optical axis. In a lens device equipped with such an optical stabilization system, the lens device incorporates a special drive mechanism which drives the corrective lenses in a given direction.

A conventional drive mechanism, comprising a direct current motor and a gear reduction mechanism, is one example of the aforementioned mechanism which drives the corrective lenses in an optical stabilization system. Such a design, however, not only entails a large motor, but also occupies a large amount of space since the gear reduction mechanism also incorporates a mechanism to eliminate backlash. Consequently, the lens barrel is unavoidably large. Also, the noise produced during the operation when the gear reduction mechanism is operated, is an additional inconvenience detracting from the quality of its operation.

The present invention heretofore provides a corrective lens drive mechanism having a drive source of an actuator using a piezoelectric element (see Japanese Laid-Open Patent Application No. 8-43872).

As shown in FIG. 17, the aforementioned, conventional, corrective lens drive mechanism has a drive source of an actuator using a piezoelectric element. A first actuator 122 eccentrically moves a first lens group L1 parallel to the X-axis direction, and a second actuator 123 eccentrically moves a second lens group L2 parallel to the Y-axis direction.

The first actuator 122 and second actuator 123 have an identical design and include a piezoelectric element 132 (142), drive shaft 131 (141) and friction-linked connector 112a (113a). The first and second actuators form an integrated structure comprising a lens retaining frame 112 (113), pad 112c (113c), and plate spring 112d (113d) which adjusts the frictional linkage force.

An X-axis position sensor 135 is attached to the lens retaining frame 112 which detects the X-axis position of the first lens group L1. A Y-axis position sensor 145 is attached to the lens retaining frame 113 which detects the Y-axis position of the second lens group L2. The X-axis position sensor 135 and Y-axis position sensor 145 may be of the conventional type. For example, a magnetic field resistance-type sensor 135 (145), which is attached to the lens retaining frame 112 (113), detects the magnetic field of a magnetic rod 136 (146) positioned parallel to the drive axis 131 (141), at a given distance, in the extension of a lens barrel (not illustrated).

The drive of the first lens group L1 by the first actuator 122 and second lens group L2 by the second actuator 123 are described hereinafter with reference to FIG. 17.

The amount by which a corrective lens should be driven is calculated based on the position of the lens as detected by the aforementioned position sensors, and the amount of camera shake detected by the output of a camera shake sensor (not illustrated). For example, a camera shake sensor which detects acceleration of the camera along the X-axis and the Y-axis. A drive pulse based on the calculated amount of the drive is then applied to the piezoelectric element of an actuator, and the corrective lens is then driven.

The drive pulse, as illustrated in FIG. 18, having a wave form of a moderately rising component followed by a rapidly falling component, is applied to a piezoelectric element 132 of actuator 122. As the moderately rising component of the drive pulse piezoelectric element 132 gradually generates an expansionary displacement in the direction of its thickness, the drive shaft 131 is displaced in the direction indicated by arrow a. Thus, the lens retaining frame 112, frictionally linked to drive shaft 131 by connector 112a, also moves in the direction of arrow a, and the first lens group L1 is displaced along the X-axis in the direction indicated by arrow a.

At the rapidly falling component of the drive pulse, the piezoelectric element 132 rapidly generates a contractionary displacement in the direction of its thickness, and the drive shaft 131 is also displaced in the direction opposite that indicated by arrow a. At such time, the lens retaining frame 112, frictionally linked to the drive shaft 131 by connector 112a, is overcome by the frictional linkage force with the drive shaft 131 due to its penetrating force, and because the lens retaining frame 112 is essentially stopped in that position, the first lens group L1 does not move.

By continually applying drive pulses of the above-noted wave form to the piezoelectric element 132, the first lens group L1 can be continually moved in the positive direction of the X-axis.

The first lens group L1 can be moved in the negative direction of the X-axis, i.e., the direction opposite that of arrow a, by applying to the piezoelectric element 132 a drive pulse having a wave form with a rapidly rising component followed by a moderately falling component.

The drive of the second lens group L2 by its actuator 123 is identical to the first lens group L1, and by applying a drive pulse to its piezoelectric element 142 of the actuator 123, the second lens group L2 can be displaced in the direction of the Y-axis (positive or negative direction), indicated by arrow b.

The above-described actuator using a piezoelectric element does not occupy a large amount of space. Therefore, the overall device can be made smaller and lighter than a drive mechanism comprising a direct current motor and gear reduction mechanism. Such an actuator is also equipped for superior performance inasmuch as noise is not generated during its operation. However, the use of two corrective lenses makes the design complex. Thus, a device having fewer number of parts, which is smaller and easier to manufacture, has long been sought after.

For this purpose, consideration has been given to reducing the number of parts and lowering the weight by creating molded structural parts from a synthetic resin. It has been learned, however, that when an actuator using a piezoelectric element employs such items molded from a synthetic resin, the oscillation of the piezoelectric element cannot be adequately converted to drive power, due to the elastic deformation of such molded items.

SUMMARY OF THE INVENTION

An object of the present invention is to resolve the aforementioned problems.

A further object of the present invention is to provide a drive device of simple design.

A further object of the present invention is to provide a drive device with a low number of parts and a reduced weight.

A further object of the present invention is to provide a drive device employing items molded from a synthetic resin, in which the elastic deformation of the synthetic resin allows the oscillation of a piezoelectric element to be adequately converted to drive power.

These and other objects are attained by a drive device comprising: an electromechanical conversion element; a baseplate secured to one end of the electromechanical conversion element and having a metal surface facing the one end; a drive member securely linked to the other end of the electromechanical conversion element and displaced together with the electromechanical conversion element; and a transport member frictionally linked to the drive member.

Furthermore, the aforesaid objectives of the present invention are also achieved by a drive comprising: an electromechanical conversion element; a baseplate secured to one end of the electromechanical conversion element; a drive member securely linked to the other end of the electromechanical conversion element and displaced together with the electromechanical conversion element; and a transport member frictionally linked to the drive member and made of a synthetic resin material.

Moreover, the aforesaid objectives of the present invention are also achieved by a drive device comprising: an electromechanical conversion element; a baseplate secured to one end of said electromechanical conversion element; a drive member securely linked to the other end of said electromechanical conversion element and displaced together with said electromechanical conversion element; and a transport member frictionally linked to said drive member and made of a metal material.

Finally, the aforesaid objectives of the present invention are also achieved by a camera shake correction device for correcting an optical device and having a drive device comprising: an electromechanical conversion element; a baseplate equipped with a securing area secured to one end of the electromechanical conversion element; a drive member securely linked to the other end of the electromechanical conversion element and displaced together with the electromechanical conversion element; and a transport member constructed from a metal material and frictionally linked to the drive member.

The invention itself, together with further objects and attendant advantages, will best be understood by reference to the following detailed description taken in conjunction with the accompanying drawings.

BRIEF DESCRIPTION OF THE DRAWINGS

FIG. 2 is a perspective view of a moving frame in a camera shake correction device.

FIG. 3 is a perspective view of a lens retaining frame in a camera shake correction device.

FIG. 4 is a perspective view of an anchor frame in a camera shake correction device.

DETAILED DESCRIPTION OF THE PREFERRED EMBODIMENTS

Figure 1:
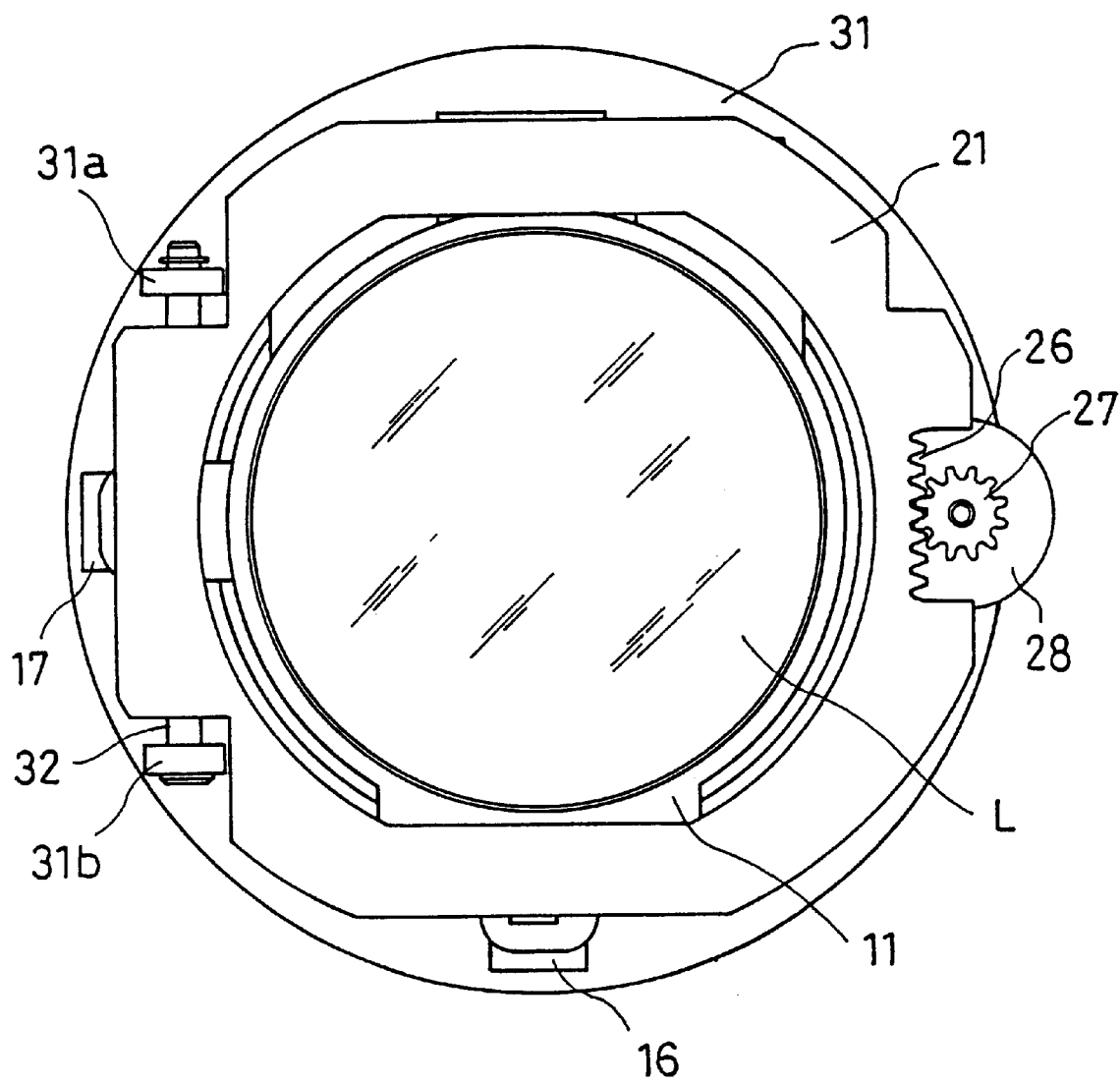
FIG. 1 is a front view illustrating the design of a camera shake correction device.

Preferred embodiments of the present invention are described hereinafter. L1ke parts are designated by like reference numbers throughout the drawings.

Turning now to the drawings, FIGS. 2–4 show the optical axis of a corrective lens L depicted on the Z-axis, and the plane perpendicular to the optical axis is described as the X-Y plane.

As best shown in FIGS. 1–4, a lens retaining frame 11 is positioned between a moving frame 21, positioned above the retaining frame 11, and an anchor frame 31, positioned below the retaining frame 11. The moving frame 21 and anchor frame 31 form circular structures having nearly identical outside dimensions. The lens retaining frame 11 retains the corrective lens L and is movably supported in the X-axis with respect to the moving frame 21. The Moving frame 21 is movably supported in the Y-axis with respect to the anchor frame 31. The anchor frame 31 is secured to a camera body or lens barrel, not illustrated.

At an external flange area 12, the lens retaining frame 11 is furnished with a frictional linkage 13, discussed hereafter, which frictionally links to a drive shaft 22b of an X-axis actuator 22 provided below the moving frame 21. The lens retaining frame 11 is also furnished with lens frame slides 14 and 15, discussed hereafter, which engage with a guide axis 23 below the moving frame 21 in a freely sliding fashion. In order to detect the X-axis and Y-axis positions of the corrective lens L, light-emitting diodes (LEDs) 16a and 17a are provided on the lens retaining frame 11 at projections 16 and 17, respectively. The diodes confront light detection elements 36 and 37 on the anchor frame 31, and are discussed hereafter.

As best shown in FIG. 3, the lens frame slides 14 and 15 comprise, respectively, two projections 14a and 14b, and 15a and 15b, which enclose and engage with the guide axis 23 on the moving frame 21 in a freely sliding fashion, leaving no excess space. Design details of the frictional linkage 13 are described with the design of the X-axis actuator 22, discussed hereafter.

The moving frame 21 is equipped with the X-axis actuator 22, which moves the lens retaining frame 11 in the X-axis, and the guide axis 23, which guides the motion of the lens retaining frame 11 in the X-axis. The guide axis 23 is held parallel to the X-axis by holders 21d and 21e that are secured to the moving frame 21.

The moving frame 21 is also equipped with moving frame slides 24 and 25, discussed hereafter, which engage with the guide axis 32 on the anchor frame 31 in a freely sliding fashion. As best shown in FIG. 2, the moving frame slides 24 and 25, like the lens frame slides 14 and 15, comprise projections which enclose and engage with the guide axis 32 on the anchor frame 31 in a freely sliding fashion, thereby leaving no excess space.

In addition, a rack 26 is formed on the exterior side of the moving frame 21, parallel to the Y-axis. The rack 26 engages with a pinion 27 attached to a rotational axis 28a of the motor 28, provided on the anchor frame 31. The rack 26 is structured such that the revolution of the motor 28 moves the moving frame 21 in the Y-axis, guided by the guide axis 32. The moving frame 21 is designed such that a spring or other appropriate means, not illustrated, impels the moving frame slides 24 and 25 in a direction to make contact with the guide axis 32, without excess space, and the moving frame slides 24 and 25 move precisely along the Y-axis.

As best shown in FIG. 3, in the anchor frame 31, the motor 28, which moves the moving frame 21 along the Y-axis, is anchored to a cutout 33. The anchor frame 31 is provided with the guide axis 32 which guides the movement of moving frame 21 along the Y-axis. The guide axis 32 is held parallel to the Y-axis by holders 31a and 31b secured to the anchor frame 31.

In order to detect the X-axis and Y-axis positions of corrective lens L, light detection elements 36 and 37 (photosensor elements, or the like) are provided on the anchor frame 31 at positions confronting light-emitting diodes (LEDs) 16a and 17a, provided on the lens retaining frame 11.

Figure 5:
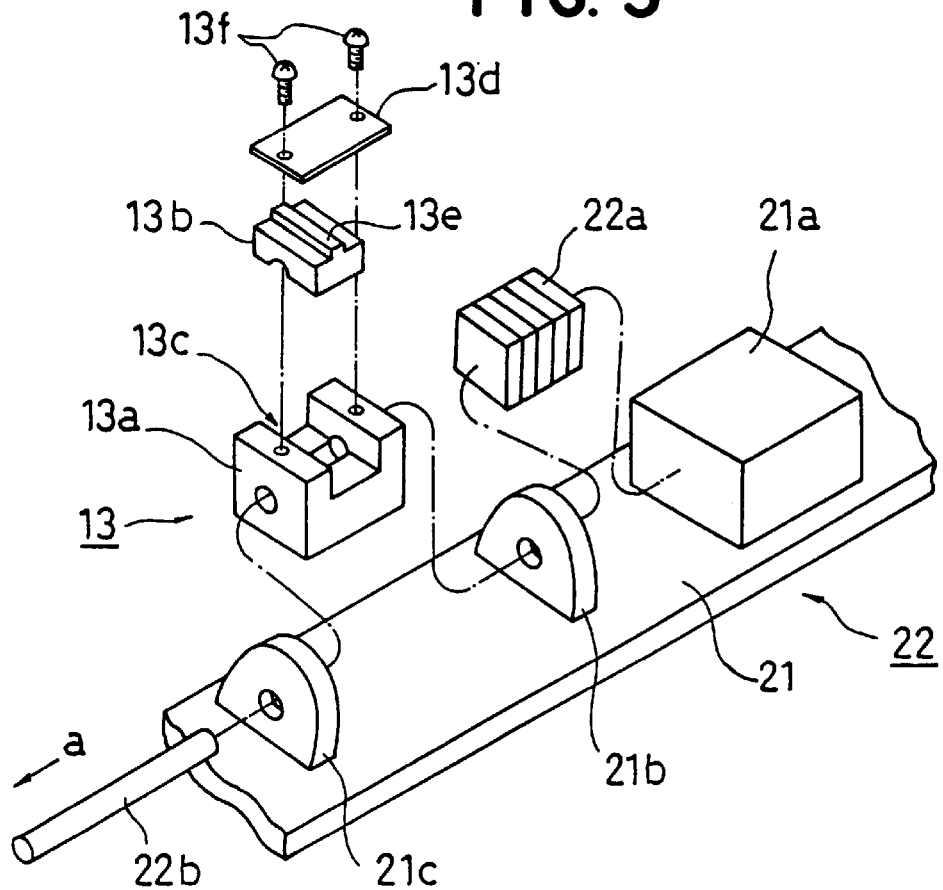
FIG. 5 is a perspective view of an X-axis actuator in a disassembled state.
Figure 6:
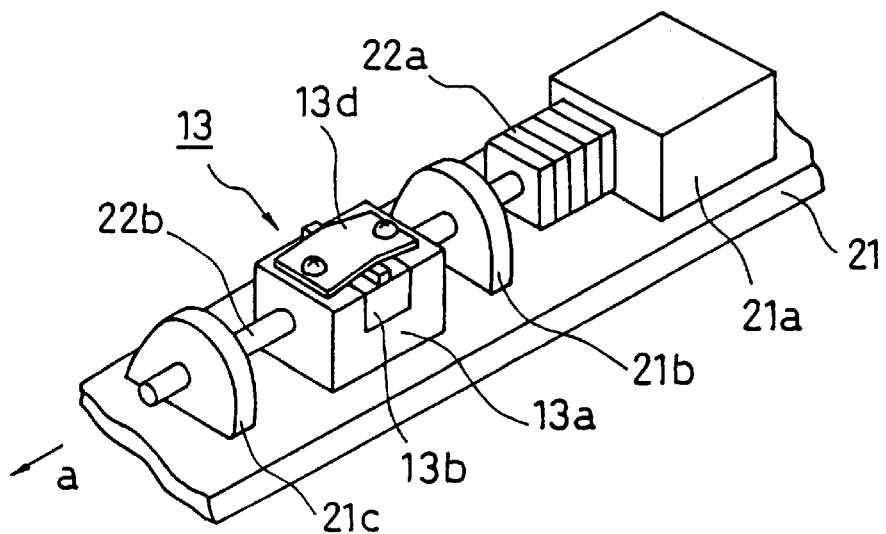
FIG. 6 is a perspective view of an X-axis actuator in an assembled state.

The structure of the X-axis actuator 22 is best described with reference to FIGS. 5 and 6. As shown previously in FIG. 2, the X-axis actuator 22 is provided on the underside of the moving frame 21. However, for illustrative purposes, the moving frame 21 is inverted in FIGS. 5 and 6. FIGS. 5 and 6 are perspective views showing the X-axis actuator 22 in a disassembled state, and an assembled state, respectively.

The X-axis actuator 22 is assembled on the moving frame 21 and comprises a piezoelectric element 22a, a drive shaft 22b adhesively anchored to the other end of the piezoelectric element 22a, and the frictional linkage 13, frictionally linked to the drive shaft 22b.

One end of piezoelectric element 22a is adhesively anchored to a support block 21a on the moving frame 21. The drive shaft 22b is movably supported in its axial direction by supports 21b and 21c. When the piezoelectric element 22a, which is adhesively secured to the end of drive shaft 22b, is displaced by expansion or contraction in the direction of its own thickness, the shaft moves in an axial direction.

The frictional linkage 13 comprises a slider 13a pierced by the drive shaft 22b and which is frictionally linked to the bottom of the drive shaft 22b, a pad 13b which is inset in a cutout 13c formed on the top of the slider 13a and frictionally linked to the top of the drive shaft 22b, and a plate spring 13d which adjusts the frictional linkage force between the drive shaft 22b and both the slider 13a and pad 13b. The projection 13e is formed on the pad 13b in direct contact with the plate spring 13d, and the frictional linkage force between these elements can be adjusted by adjusting screws 13f which secure the plate spring 13d to the slider 13a. In addition, commonly known means can be applied in the structure of the frictional linkage 13, or as a means to adjust the frictional linkage force therein.

Figure 7:
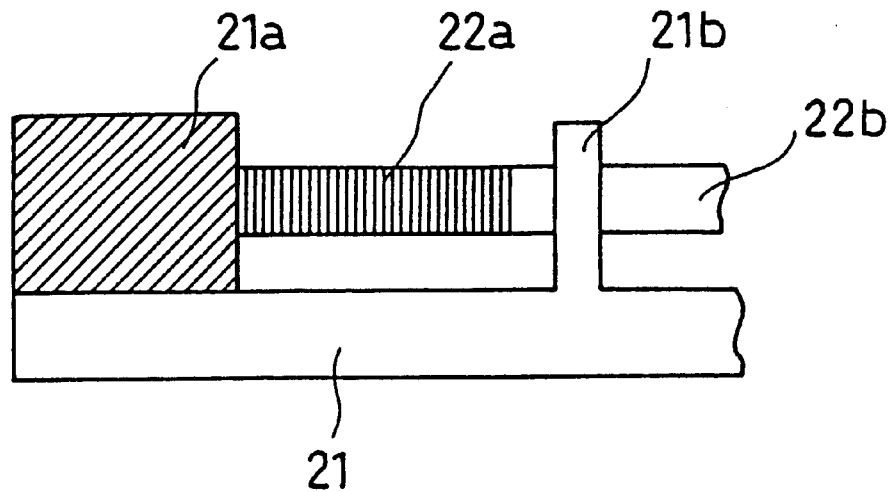
FIG. 7 is a side view illustrating the design of a piezoelectric element securing area in an X-axis actuator.

Variations on the embodiment described above are possible. For example, the moving frame 21 can also be made from a synthetic resin material, as well as a metal material. When the moving frame 21 is made from a metal material, the support block 21a on the moving frame 21 is also made from a metal material, and the piezoelectric element 22a is adhesively bound directly to the support block 21a. When the moving frame 21 is made from a synthetic resin material, the support block 21a is made from a metal material, and the piezoelectric element 22a is adhesively bound to support block 21a, as shown in FIG. 7.

Figure 8:
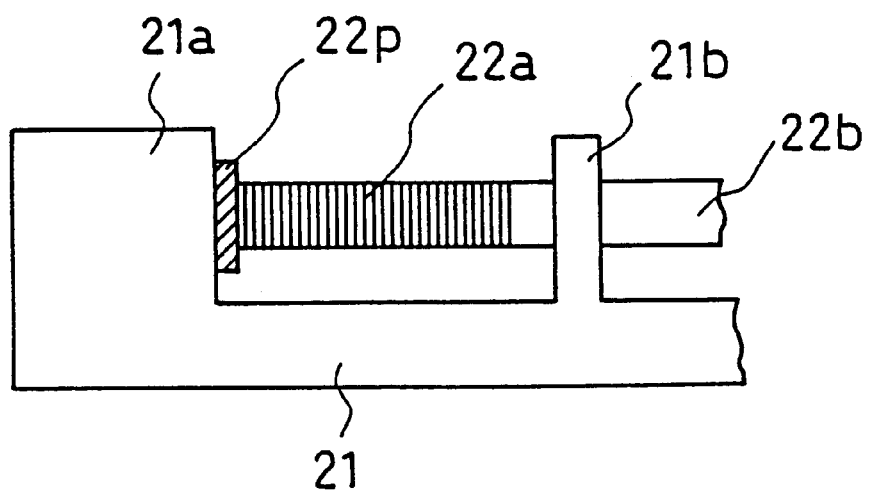
FIG. 8 is a side view illustrating another design of a piezoelectric element securing area in an X-axis actuator.

As best shown in FIG. 8, when the moving frame 21 and the support block 21a are made from a synthetic resin material, the piezoelectric element 22a is not adhesively bound directly to the support block 21a made from a synthetic resin material, but rather, secured by interposing a metal plate 22p between the support block 21a and piezoelectric element 22a. In such an instance, rigidity is increased by carrying out metal deposition or applying a metal plating 22p on the surface of the support block 21a where the piezoelectric element 22a indirectly contacts the support block 21a. Consequently, when the moving frame 21 and support block 21a are made from a synthetic resin material, expansionary or contractionary displacement arising in the piezoelectric element 22a, in the direction of its thickness, is efficiently transmitted to the drive shaft 22b, and is not absorbed by members made from a synthetic resin material (i.e., the moving frame 21 and support block 21a).

In order to efficiently transmit the expansionary or contractionary displacement, arising in the piezoelectric element 22a to the frictional linkage 13, the drive shaft 22b should be made from a highly rigid material, such as a metal material. Conversely, if the drive shaft 22b is made from a soft material, such as a synthetic resin material, expansionary or contractionary displacement arising in the piezoelectric element 22a cannot always be efficiently transmitted to the frictional linkage 13.

In order to efficiently transmit the expansionary or contractionary displacement of the drive shaft 22b to the lens retaining frame 11, the contact surface between the drive shaft 22b and the slider 13a of the frictional linkage 13 should also be made from a highly rigid material.

Figure 9:
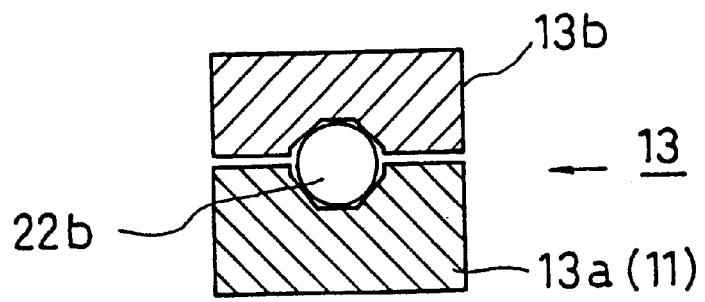
FIG. 9 is a cross-sectional view illustrating the design of a frictional linkage in an X-axis actuator.
Figure 10:
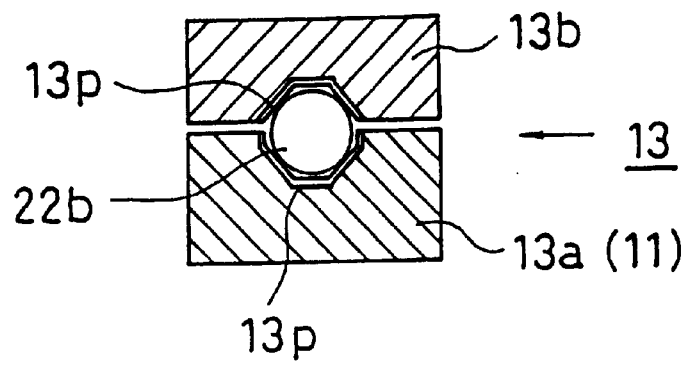
FIG. 10 is a cross-sectional view illustrating another design of a frictional linkage in an X-axis actuator.
Figure 11:
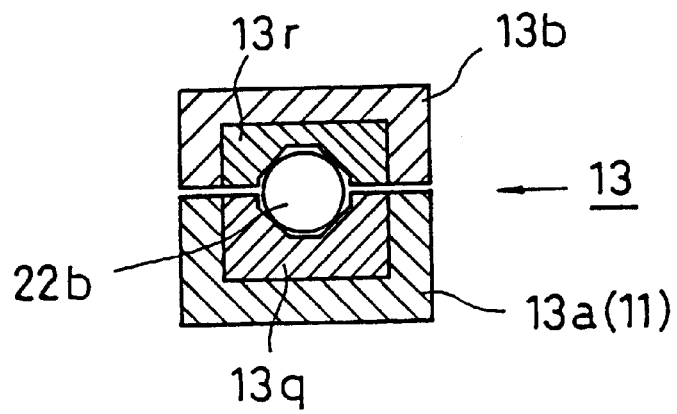
FIG. 11 is a cross-sectional view illustrating another design of a frictional linkage in an X-axis actuator.

Turning now to FIGS. 9–11, there exist variations on the embodiments of the cross-sectional structure of the frictional linkage 13. As best shown in FIG. 9, the slider 13a and the lens retaining frame 11 are constructed from a metal material as a single unit, and the pad 13b is also constructed from a metal material. Efficient operation exists as a result of the contact surfaces between the slider 13a and drive shaft 22b, and the pad 13b and drive shaft 22b, comprising a highly rigid metal material.

As best shown in FIG. 10, the slider 13a and lens retaining frame 11 are of synthetic resin material as an integrated unit, whereby the elements are constructed from a rigid synthetic resin material with a Rockwell hardness greater than 120. In such an instance, rigidity is increased by carrying out metal deposition or applying a metal plating 13p on the surface where the slider 13a contacts the drive shaft 22b. The pad 13b may be made from a metal material, or, if the pad 13b is made from a rigid synthetic resin, metal deposition or metal plating 13p can also be applied to the contact surface of the drive shaft 22b, as stated above.

As best shown in FIG. 11, the slider 13a and lens retaining frame 11 are constructed from a synthetic resin material as an integrated unit. In such an instance, a separate metal material block 13q has been inset in the side of the slider 13a which contacts the drive shaft 22b. The pad 13b, positioned on the upper side of the frictional linkage 13, is also made from a rigid synthetic resin, and a separate metal material block 13r has also been inset in the surface which contacts the drive shaft 22b.

Figure 12:
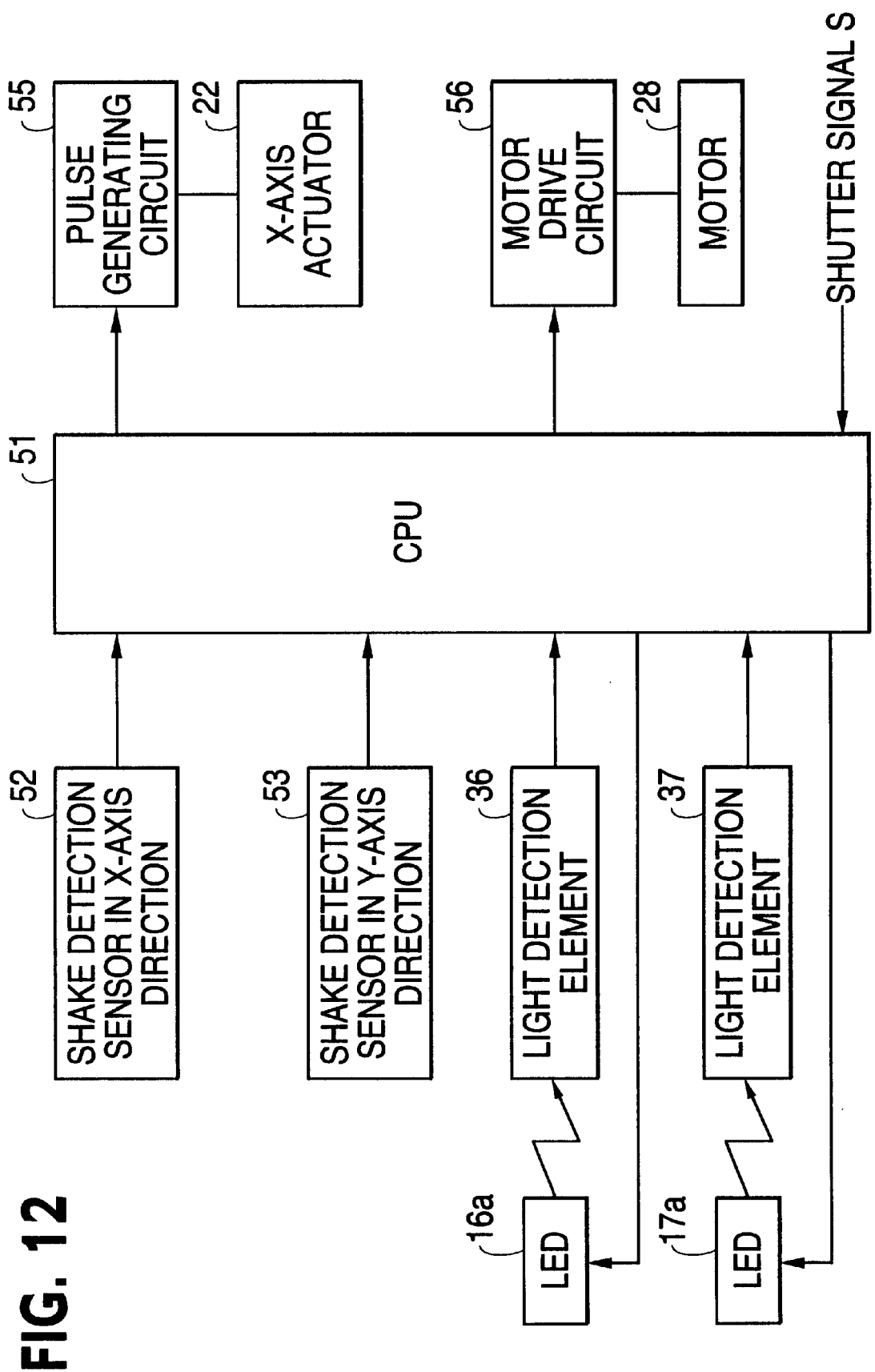
FIG. 12 is a block diagram illustrating one example of a drive circuit.

Turning now to FIG. 12, the present invention has a drive circuit comprising a CPU as a control unit 51, quantitative camera shake detection sensors 52 and 53, which quantitatively detect camera shake in the X-axis and Y-axis directions and are connected to the I/O port of control unit 51, light detection elements 36 and 37 which detect the X-axis and Y-axis position of the corrective lenses, LEDs 16a and 17a, pulse generating circuit 55, which drives X-axis actuator 22 to provide X-axis drive, and a motor drive circuit 56, which drives the motor 28 to provide the Y-axis drive. Here, a shutter signal S is input to the input port of the control unit 51 as a signal commanding a corrective operation by a corrective lens.

The operation of the circuit is described below. As previously discussed, the quantitative detection of camera shake in the preferred embodiment involves detecting the acceleration of the camera in the X-axis and Y-axis directions. When a shutter signal is input to the control unit 51 and a corrective operation by the corrective lens L is ordered, the control unit 51 calculates the amount of drive required along the X-axis and Y-axis based on the position of the corrective lens and the amount of camera shake detected by the quantitative camera shake detection sensors 52 and 53 and light detection elements 36 and 37. Based on the calculated amount of X-axis drive, the control unit 51 operates the pulse generating circuit 55, which operates the X-axis actuator 22, while also operating the motor drive circuit 56, which drives the motor 28 and corrective lens L along the X-axis and Y-axis.

Figure 18:
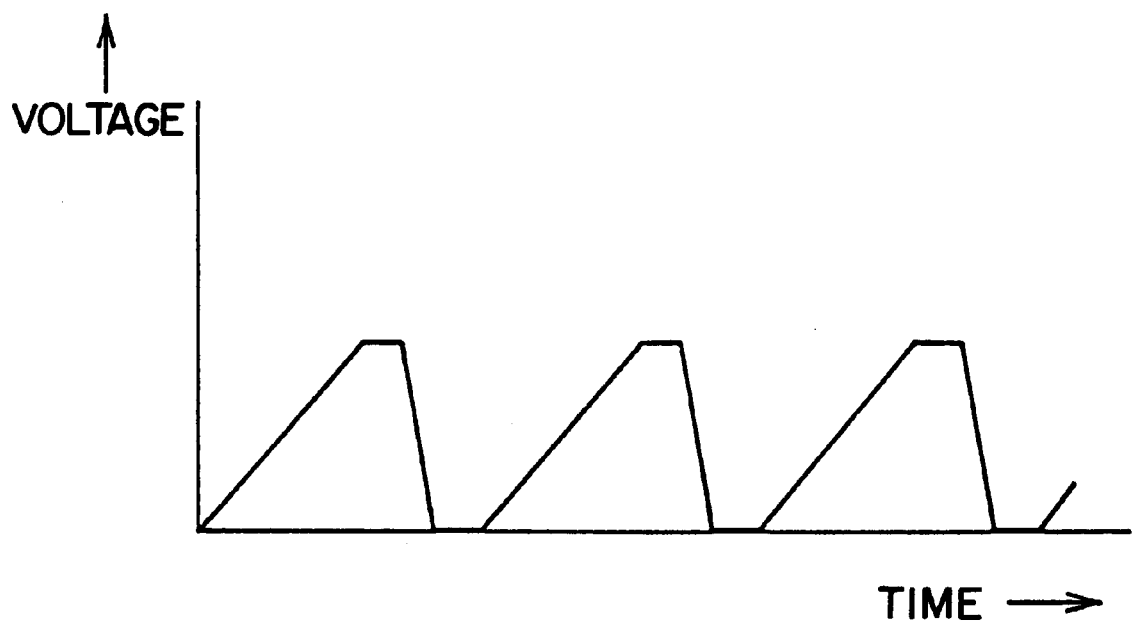
FIG. 18 is a graph of Voltage vs. Time of the drive pulse delivered to the piezoelectric element.

As shown in FIG. 18, once the corrective lens drive along the X-axis has been determined, a drive pulse with a wave form comprising a moderately rising component followed by a rapidly falling component, is applied to the piezoelectric element 22a of X-axis actuator 22. During the moderately rising component of the drive pulse, the piezoelectric element 22a produces a slight expansionary displacement in the direction of its thickness, and the drive shaft 22b moves in the direction indicated by arrow a. Thus, the lens retaining frame 11, frictionally linked to the drive shaft 22b by the frictional linkage 13, also moves in the direction indicated by arrow a.

During the rapidly falling component of the drive pulse, the piezoelectric element 22a produces a rapid contractionary displacement in the direction of its thickness, and the drive shaft 22b moves in the opposite direction indicated by arrow a. At such time, the lens retaining frame 11, frictionally linked to the drive shaft 22b by the frictional linkage 13, is overcome by the frictional linkage force between the drive shaft 22b and the frictional linkage 13 due to the penetrating force of the shaft, and the lens retaining frame 11 is essentially stopped in that position without movement. Here, the meaning of the term "essentially" depends on the drive time and may include the overall movement in the direction of arrow a, in which the lens retaining frame 11 slides and continues to move in either the direction of arrow a, or the opposite direction in the space between the frictional linkage 13 and drive shaft 22b. The kind of movement which occurs is ultimately determined by the applicable frictional conditions.

By continually applying the drive pulses of the above-noted wave form to piezoelectric element 22a, the lens retaining frame 11 and corrective lens L can be continually moved in the positive direction of the X-axis.

The corrective lens L can be moved in the negative direction of the X-axis, i.e., the direction opposite that of arrow a, by applying to the piezoelectric element 22a, a drive pulse having a wave form with a rapidly rising component followed by a moderately falling component. When the lens retaining frame 11 moves to a given position, the supply of the drive pulses is terminated, and the movement of the corrective lens L stops.

The motor 28 executes the lens drive along the Y-axis. Once the amount of the lens drive along the Y-axis is determined, the rotational direction of the motor 28, corresponding to a drive quantity signal, is determined, and the drive is carried out. The rotation of the motor 28, transmitted to the rack 26 and pinion 27, moves the moving frame 21 along the guide axis 32 in the Y-axis direction. Due to the lens retaining frame 11 being held on the moving frame 21, the lens retaining frame 11 also moves along the Y-axis. Once the lens retaining frame 11 moves to a given position, power to the motor is cut off, and the movement of the corrective lens L ceases.

In the first preferred embodiment of the present invention, the driven weight, when the corrective lens L was driven along the X-axis, is comparatively light relative to the lens retaining frame 11 and corrective lens L. Therefore, an X-axis actuator using a piezoelectric element was employed. However, the driven weight during the drive along the Y-axis was comparatively heavy relative to the lens retaining frame 11, corrective lens L and moving frame 21. Therefore, the motor 28 was used. This allows the large weight of the moving frame 21 to be easily driven.

Additional variations on the embodiment described above are possible. A second preferred embodiment of the present invention is described below. For example, in the second preferred embodiment, an actuator using a piezoelectric element is also used in the lens drive along the Y-axis.

Figure 13:
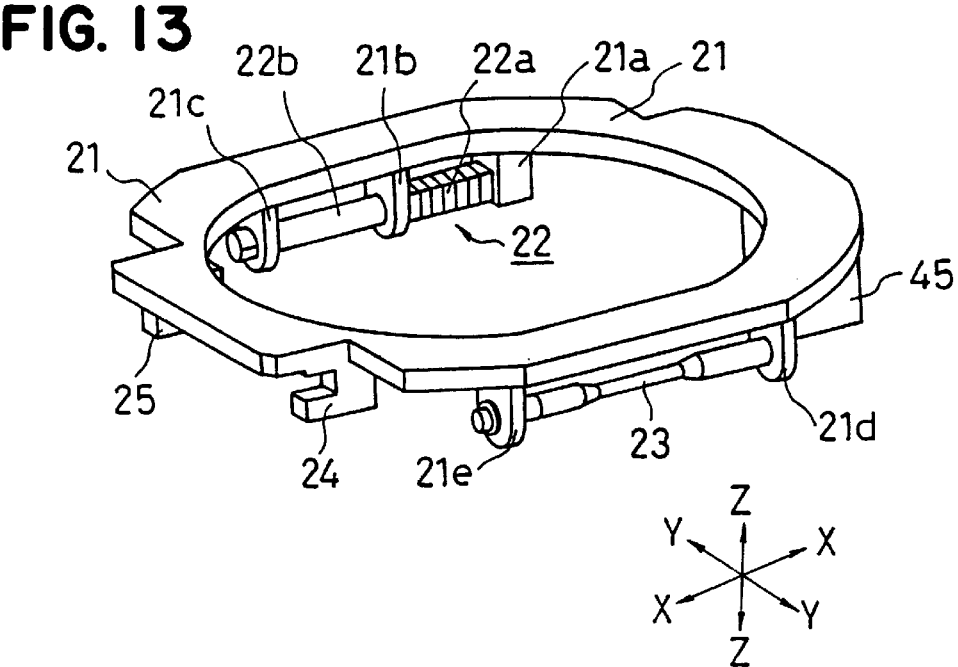
FIG. 13 is a perspective view of a moving frame in a second preferred embodiment of a camera shake correction device.
Figure 14:
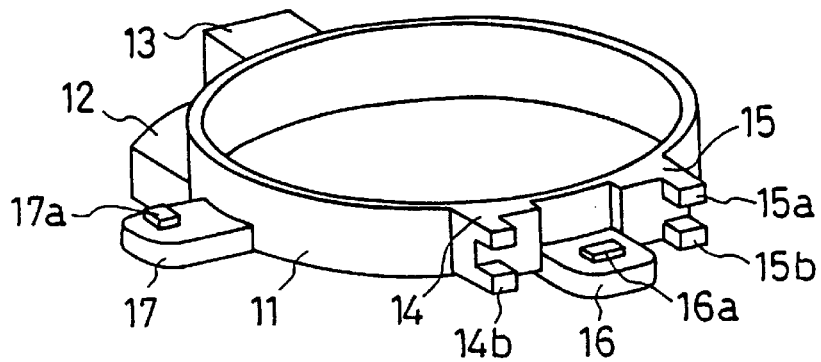
FIG. 14 is a perspective view of a lens retaining frame in a second preferred embodiment of a camera shake correction device.
Figure 15:
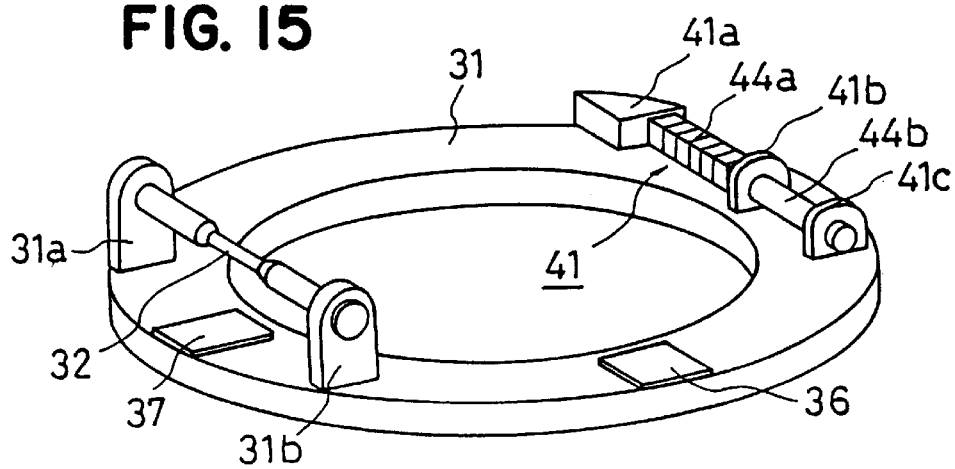
FIG. 15 is a perspective view of an anchor frame in a second preferred embodiment of a camera shake correction device.

Turning now to FIGS. 13–15 regarding the second preferred embodiment, the optical axis of the corrective lens L is described as the Z-axis, and the plane perpendicular to the optical axis is described as the X-Y plane. In addition, parts common to the design of the first preferred embodiment are designated by like reference numbers; while any related detailed description is omitted, and only mutually different parts are described in detail below.

FIGS. 13–15 show a lens retaining frame 11, a moving frame 21, and an anchor frame 31. The lens retaining frame 11 is positioned between the moving frame 21, which is disposed above the retaining frame 11, and the anchor frame 31, which is disposed below the retaining frame 11. The moving frame 21 and anchor frame 31 form circular structures, having nearly identical outside dimensions. The lens retaining frame 11 retains the corrective lens L and is movably supported in the X-axis with respect to the moving frame 21. The moving frame 21 is movably supported in the Y-axis with respect to the anchor frame 31.

The structure of the lens retaining frame 11 is the same as that in the first preferred embodiment.

Moreover, the moving frame 21 is equipped with an X-axis actuator 22, which moves the lens retaining frame 11 in the X-axis, and a guide axis 23, which guides the motion of the lens retaining frame 11 in the X-axis. The moving frame 21 is also equipped with moving frame slides 24 and 25, which engage with a guide axis 32 on the anchor frame 31 in a freely sliding fashion, and a frictional linkage 45, discussed hereafter, which is frictionally linked to a drive shaft 44b of a Y-axis actuator 41.

An anchor frame 31 is provided with a Y-axis actuator 41, which moves the moving frame 21 in the Y-axis, and the guide axis 32, which guides the movement of the moving frame 21 in the Y-axis.

Figure 16:
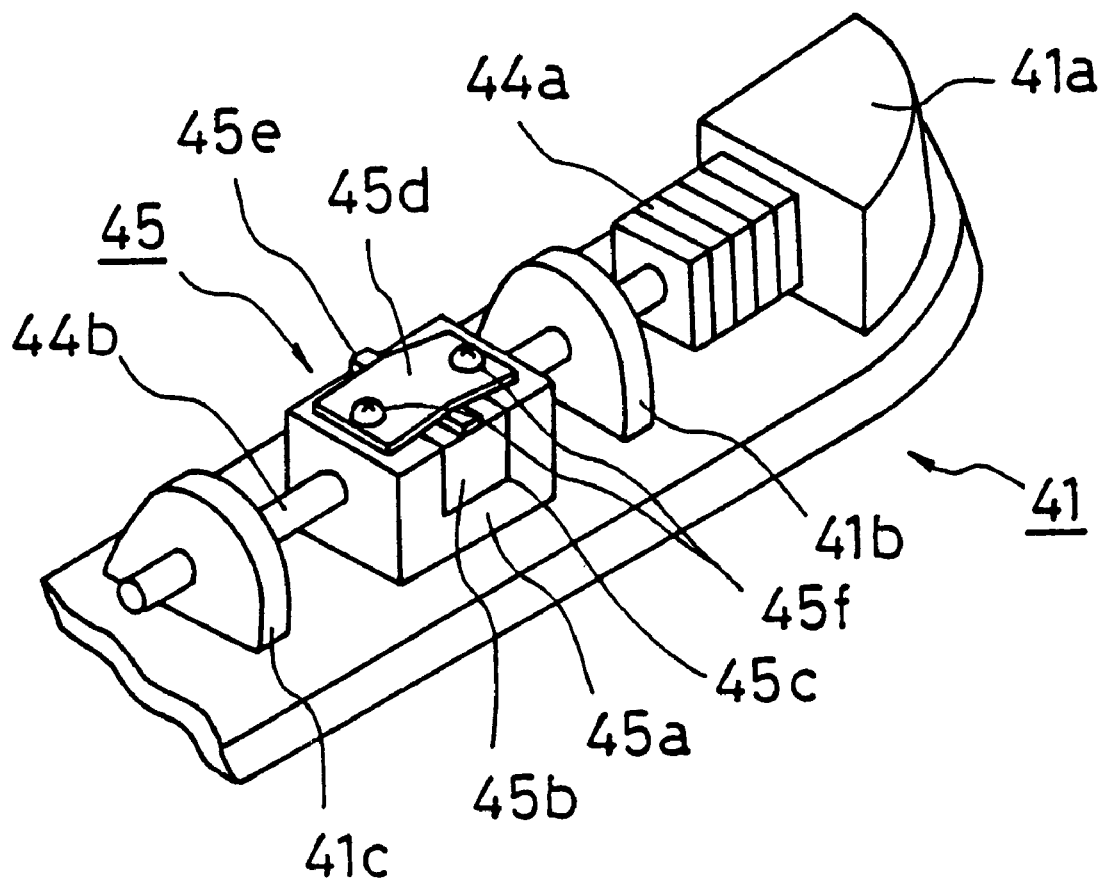
FIG. 16 is a perspective view of a Y-axis actuator in an assembled state.
Figure 17:
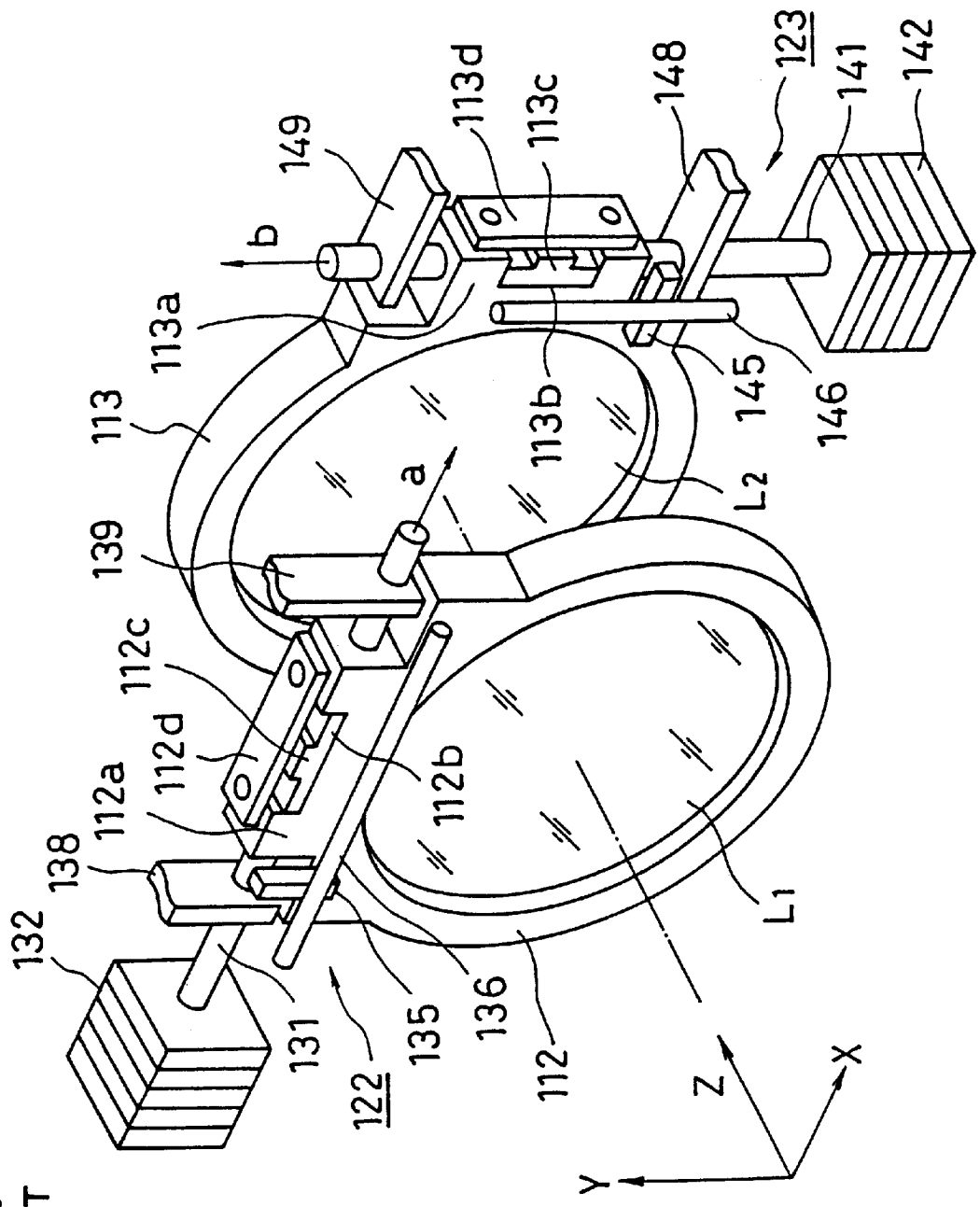
FIG. 17 is a perspective view illustrating the design of a conventional correction lens drive mechanism employing an actuator using a piezoelectric element.

As best shown in FIG. 16, the structure of the Y-axis actuator 41 has a structure identical to that of X-axis actuator 22, as previously illustrated in FIG. 5 and FIG. 6. Specifically, the Y-axis actuator 41 comprises a piezoelectric element 44a, drive shaft 44b, adhesively anchored to the other end of piezoelectric element 44a, and frictional linkage 45 frictionally linked to drive shaft 44b.

One end of the piezoelectric element 44a is adhesively anchored to support a block 41a on the anchor frame 31. The drive shaft 44b is movably supported in its axial direction by supports 41b and 41c on the anchor frame 31. When the piezoelectric element 44a, adhesively secured to the end of the drive shaft 44b, is displaced by expansion or contraction in the direction of its own thickness, the shaft moves in an axial direction.

The frictional linkage 45 comprises a slider 45a pierced by a drive shaft 44b, frictionally linked to the bottom of the drive shaft 44b, a pad 45b inset in a cutout 45c formed on the top of the slider 45a, frictionally linked to the top of drive shaft 44b, and a plate spring 45d which adjusts the frictional linkage force between the drive shaft 44b and both the slider 45a and pad 45b. A projection 45e formed on the pad 45b directly contacts a plate spring 45d, and the frictional linkage forces between these elements can be adjusted by adjusting screws 45f, which secure the plate spring 45d to the slider 45a. Otherwise, the structure and operation of Y-axis actuator 41 are identical to that of X-axis actuator 22, and additional detailed description is therefore omitted.

The second preferred embodiment, described above, employs an actuator using a piezoelectric element to drive the corrective lens L in an X-axis direction and a Y-axis direction. When the driven weight is comparatively light and the drive force of an actuator is sufficient, the actuator utilizes a piezoelectric element for driving in the X-axis and Y-axis directions, which in turn, further reduces the size and weight of the overall device. It also eliminates the risk of noise produced by a gear mechanism, when a gear mechanism is used, as in the foregoing first preferred embodiment.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein. It is therefore intended that the foregoing detailed description be understood that it is the following claims, including all equivalents, which are intended to define the scope of this invention.

We claim:

1. A drive device comprising:
   a non-rotatable electromechanical conversion element;
   a baseplate secured to one end of said electromechanical conversion element and having a metal surface facing the one end;
   a drive member securely linked to the other end of said electromechanical conversion element and displaced together with said electromechanical conversion element; and
   a transport member frictionally linked to said drive member.

2. The drive device according to claim 1, wherein said baseplate being made of a synthetic resin material.

3. The drive device according to claim 2, wherein said baseplate being made of a rigid synthetic resin material with a Rockwell hardness of about 120 or more.

4. The drive according to claim 2, wherein said metal surface being produced using a metal deposition.

5. The drive device according to claim 2, wherein said metal surface being produced using a metal plating.

6. A drive device according to claim 1, wherein said baseplate includes a support member that supports said electromechanical conversion element and a frame member that supports said support member.

7. The drive device according to claim 6, wherein said support member being made of a metal material.

8. The drive device according to claim 6, wherein said support member being made of a rigid synthetic resin material with a Rockwell hardness of about 120 or more.

9. The drive device according to claim 6, wherein said support member includes a metal plate as the metal surface.

10. The drive device according to claim 6, wherein said frame member being made of a rigid synthetic resin material with a Rockwell hardness of about 120 or more.

11. A drive device comprising:
    a non-rotatable electromechanical conversion element;
    a baseplate secured to one end of said electromechanical conversion element;
    a drive member securely linked to the other end of said electromechanical conversion element and displaced together with said electromechanical conversion element; and
    a transport member frictionally linked to said drive member and made of a synthetic resin material.

12. The drive device according to claim 11, wherein said transport member has a metal surface facing said drive member.

13. The drive device according to claim 12, wherein said metal surface being produced using a metal deposition.

14. The drive device according to claim 12, wherein said metal surface being produced using a metal plating.

15. The drive device according to claim 12, wherein said transport member includes a slider member and a pad member.

16. The drive device according to claim 11, wherein said transport member includes a metal block facing said drive member.

17. The drive device according to claim 16, wherein said transport member includes a slider member and a pad member.

18. The drive device according to claim 11, wherein
said transport member being made of a rigid synthetic resin material with a Rockwell hardness of about 120 or more.

19. The drive device according to claim 11, wherein
said baseplate has metal surface facing the one end of said electromechanical conversion element.

20. A drive device comprising:
a non-rotatable electromechanical conversion element;
a baseplate secured to one end of said electromechanical conversion element;
a drive member securely linked to the other end of said electromechanical conversion element and displaced together with said electromechanical conversion element; and
a transport member frictionally linked to said drive member and made of a metal material.

21. The drive device according to claim 20, wherein
said baseplate has a metal surface facing the one end of said electromechanical conversion element.

22. A camera shake correction device for correcting an optical device and having a drive device, comprising:
an electromechanical conversion element;
a baseplate equipped with a securing area secured to one end of said electromechanical conversion element;
a drive member securely linked to the other end of said electromechanical conversion element and displaced together with said electromechanical conversion element; and
a transport member constructed from a metal material and frictionally linked to said drive member.

* * * * *